(12) United States Patent
Salot et al.

(10) Patent No.: US 8,697,287 B2
(45) Date of Patent: Apr. 15, 2014

(54) PROCESS FOR MANUFACTURING A LITHIATED ELECTRODE, LITHIATED ELECTRODE THAT CAN BE OBTAINED BY THIS PROCESS, AND ITS USES

(75) Inventors: Raphaël Salot, Lans-en-Vercors (FR); Benjamin Laforge, Grenoble (FR); Henri Boucher, Meylan (FR)

(73) Assignee: Commissariat a l'Energie Atomique, Paris (FR)

(*) Notice: Subject to any disclaimer, the term of this patent is extended or adjusted under 35 U.S.C. 154(b) by 881 days.

(21) Appl. No.: 11/658,525

(22) PCT Filed: Jul. 29, 2005

(86) PCT No.: PCT/FR2005/050633
§ 371 (c)(1),
(2), (4) Date: Jan. 25, 2007

(87) PCT Pub. No.: WO2006/021718
PCT Pub. Date: Mar. 2, 2006

(65) Prior Publication Data
US 2008/0311477 A1    Dec. 18, 2008

(30) Foreign Application Priority Data
Jul. 30, 2004 (FR) .................................. 04 51738

(51) Int. Cl.
| H01M 4/26 | (2006.01) |
| H01M 4/40 | (2006.01) |
| H01M 4/58 | (2010.01) |
| H01M 10/38 | (2006.01) |

(52) U.S. Cl.
USPC ................ 429/231.95; 427/123; 204/192.1

(58) Field of Classification Search
None
See application file for complete search history.

(56) References Cited

U.S. PATENT DOCUMENTS

| 6,162,560 A | 12/2000 | Yamada et al. |
| 6,398,824 B1 * | 6/2002 | Johnson ...................... 29/623.1 |
| 6,398,924 B1 | 6/2002 | Pinarbasi |
| 6,761,744 B1 | 7/2004 | Tsukamoto et al. |
| 2004/0161640 A1 * | 8/2004 | Salot ................................. 429/9 |

FOREIGN PATENT DOCUMENTS

| EP | 1 282 179 | 2/2003 | |
| WO | WO 01/97304 | 12/2001 | |
| WO | WO 01/97304 A1 * | 12/2001 | ............. H01M 4/04 |
| WO | WO 02/095849 | 11/2002 | |
| WO | WO 2004/012283 | 2/2004 | |

OTHER PUBLICATIONS

Patent Abstracts of Japan, JP 10 144295, vol. 1998, No. 10 (Aug. 31, 1998).

* cited by examiner

Primary Examiner — Barbara Gilliam
Assistant Examiner — Angela Martin
(74) Attorney, Agent, or Firm — Brinks Gilson & Lione

(57) ABSTRACT

The invention relates to a process for manufacturing a lithiated electrode, which comprises:
  the deposition, on a substrate, of several layers of a non-lithiated electrode material and several lithium layers in order to form a multilayer consisting of an alternation of layers of non-lithiated electrode material and lithium layers, this multilayer starting with and terminating with a layer of non-lithiated electrode material; and
  the thermal annealing of the multilayer thus formed.

It also relates to a lithiated electrode that can be obtained by this process and to the uses of this electrode: production of thin-film lithium batteries, especially microbatteries for chip cards, "smart" labels, horological articles, miniaturized communications tools, microsystems; production of thin-film supercapacitors and electrochromic cells.

10 Claims, No Drawings

PROCESS FOR MANUFACTURING A LITHIATED ELECTRODE, LITHIATED ELECTRODE THAT CAN BE OBTAINED BY THIS PROCESS, AND ITS USES

This application is a National Stage application of International Application No. PCT/FR2005/050633, filed Jul. 29, 2005, the entire contents of which are hereby incorporated herein by reference. This application also claims priority under 35 U.S.C. §119 to French Patent Application No. 0451738 filed Jul. 30, 2004, the entire contents of which is hereby incorporated herein by reference.

TECHNICAL FIELD

The present invention relates to a process for manufacturing a lithiated electrode, to a lithiated electrode that can be obtained by this process, and to the uses of this electrode.

Firstly, such an electrode may be used for the production of thin-film lithium batteries and, in particular, microbatteries intended to be incorporated into chip cards, especially with a view to increasing their security, "smart" labels, of horological articles or miniaturized communication tools, such as portable microcomputers and telephones, or else microsystems of the physical, chemical or biological type, actuators, microfluidic circuits and the like.

The invention may also be used to produce thin-film supercapacitors or electrochromic cells.

PRIOR ART

"All-solid-state" microbatteries are batteries in which all the components (current collectors, positive and negative electrodes, electrolyte) are in the form of thin films and constitute an active multilayer measuring in total around 10-15 microns in thickness. This active multilayer is encapsulated in material suitable for protecting it from the surrounding medium, and especially from moisture, this material also being in thin-film form.

The operating principle of these microbatteries is based on the injection and extraction (intercalation-deintercalation) of alkaline metal ions or of protons in the positive electrode. These are usually lithium ions coming from a lithium metal electrode.

The thin films are produced by physical vapour deposition (PVD) or by chemical vapour deposition (CVD) depending on the nature of their constituent materials. Various materials may in fact be used. Thus, for example:

the current collectors, which are metallic, may be based on platinum, chromium, gold or titanium;

the positive electrode may consist of $LiCoO_2$, $LiNiO_2$, $LiMn_2O_4$, CuS, $CuS_2$, $WO_yS_z$, $TiO_yS_z$ or $V_2O_5$;

the electrolyte, which must be both a good ionic conductor and an electronic insulator, may be a glassy material based on a boron oxide, a lithium oxide or a lithium salt, and especially based on a lithiated phosphate such as a LiPON or a LiSiPON, these representing at the present time the most effective electrolytes;

cobalt/lithium, nickel/lithium or manganese/lithium mixed oxide for example.

Now, each of these solutions has major drawbacks. But, since the melting point of lithium is 181° C., lithium metal anodes greatly limit the possibility of using microbatteries at high temperatures. In addition, since lithium metal is highly reactive with respect to the surrounding medium, this type of anode requires an encapsulation, incurring a cost penalty.

The use of a lithiated insertion material of the mixed oxide type, as cathode, itself requires this material to undergo thermal annealing at very high temperatures, that is to say of about 600° C. or higher, in order to favour its crystallization and to increase its stability of inserting/deinserting the lithium ions. Now, such annealing is incompatible with fitting the microbatteries into microsystems using what is called the "above-IC" technology of which the aim is to place these microbatteries in the upper part of integrated circuits, these circuits being, in fact, incapable of withstanding such temperatures.

The inventors, therefore, set the objective of providing lithiated electrodes which can be incorporated into lithium microbatteries, and in general into any thin-film lithium battery, and which are devoid of the aforementioned drawbacks.

SUMMARY OF THE INVENTION

These objectives are achieved, and also others, by a process for manufacturing a lithiated electrode, which comprises:

the deposition, on a substrate, of several layers of a non-lithiated electrode material and several lithium layers in order to form a multilayer consisting of an alternation of layers of non-lithiated electrode material and lithium layers, this multilayer starting with and terminating with a layer of non-lithiated electrode material; and the thermal annealing of the multilayer thus formed.

Thus, the process according to the invention provides for the use of a non-lithiated electrode material, of the type of those conventionally used in lithium batteries, the processing of which material does not require to be annealed at temperatures exceeding 300° C., and for this material to be lithiated in situ, by combining several layers of this non-lithiated electrode material with several lithium layers (which also does not require recourse to high temperatures) and by then subjecting all of these layers to a thermal annealing operation so as to promote the diffusion of lithium into the non-lithiated electrode material.

Thus, what is obtained in the end is an electrode formed from a single lithium-containing material.

In general, it is desirable for the electrode to have a homogeneous composition after the layers of non-lithiated electrode material and the lithium layers have been deposited on the substrate.

According to the invention, a homogeneous composition may be obtained by promoting the diffusion of lithium by the thermal annealing but also by increasing the number of non-lithiated electrode material and lithium layers that are deposited on the substrate.

The process according to the invention therefore preferably comprises the deposition, on the substrate:

a) of a layer of non-lithiated electrode material;
b) of a lithium layer; and
c) of a layer of non-lithiated electrode material, and the repetition of steps b) and c) from 1 to 30 times depending on the desired level of compositional homogeneity. This results in a multilayer comprising from 3 to 32 layers of non-lithiated electrode material for 2 to 31 lithium layers.

Also preferably, the thermal annealing is carried out at a temperature ranging from 100 to 300° C. and in an inert atmosphere, for example in argon, such a temperature being sufficient to promote the diffusion of lithium owing to its melting point.

In particular, the thermal annealing is carried out at a temperature of about 200° C. for about 1 hour, either in situ, that is to say in the same chamber as that in which the layers of non-lithiated electrode material and lithium are deposited on the substrate, or in another chamber.

The layers of non-lithiated electrode material and the lithium layers may be deposited on the substrate by conventional thin-film deposition techniques, particularly by PVD techniques. The layers of non-lithiated electrode material may especially be deposited by RF (radio frequency) sputtering or by DC (direct current) sputtering, whereas the lithium layers are deposited by vacuum thermal evaporation.

Owing to the fact that the process according to the invention includes no operation requiring a temperature above 300° C., either the first or the second electrode of a thin-film battery may be manufactured, these acting as negative electrode and positive electrode respectively. Therefore the substrate may be either a current collector (for manufacture of the first electrode) or an electrolyte already combined with an electrode and with a current collector (for manufacture of the second electrode).

According to the invention, the non-lithiated electrode material may a priori be any material containing no lithium but capable of inserting this element, and in particular any non-lithiated material conventionally used as positive or negative electrode in a lithium battery, provided that it can be deposited in layers, and in particular in thin layers, that is to say layers with a thickness of at most 5 microns.

As examples of non-lithiated materials conventionally used as positive electrodes, mention may be made of vanadium oxides, for example $V_2O_5$, manganese oxides, copper sulphides ($CuS$, $CuS_2$, etc.), titanium oxysulphides $TiO_yS_z$ and tungsten oxysulphides $WO_yS_z$, while as examples of non-lithiated materials conventionally used as negative electrodes, mention may be made of silicon and its alloys (NiSi, FeSi, etc.), tin and its alloys ($Cu_6Sn_5$, SnSb, $Ni_3Sn_2$, etc.), carbon, indium nitrides $InN_x$, tin nitrides $SnN_x$, tin oxides, for example $SnO_2$, cobalt oxides, for example $CO_3O_4$, and SiTONs (silicon and tin oxynitrides).

According to the invention, it is also possible to use amorphous carbon (a:CH), $C_xN$ or $C_xS$ with a disorganized structure as non-lithiated electrode material.

Advantageously, the layers of non-lithiated electrode material each have a thickness of about 50 nm to 1 µm, whereas the lithium layers each have a thickness of about 10 nm of 0.5 µm.

The process according to the invention has many advantages. Specifically, although it includes the deposition of two different materials in the form of layers on a substrate, it does allow a homogeneous lithiated material to be produced that can serve as negative electrode or positive electrode in a lithium battery. It also offers the possibility of controlling, during manufacture of the electrode, the amount of lithium that is added to the non-lithiated electrode material and to optimize this amount according to the type of non-lithiated electrode material used.

It also has the advantage of being simple to implement, of not including any operation requiring a temperature above 300° C. and, consequently, of being perfectly compatible with the industrial production processes used in microelectronics and, in particular, with microbatteries assembled in "above-IC" configuration in microsystems.

The subject of the invention is also a lithiated electrode that can be obtained by a process as defined above.

Yet another subject of the invention is a thin-film lithium battery that includes a lithiated electrode as defined above, which electrode can act as negative electrode or as positive electrode.

In particular, this lithium battery is a microbattery.

Other features and advantages of the invention will become more clearly apparent on reading the rest of the description below, which relates to two examples of microbattery embodiments comprising a lithiated electrode manufactured in accordance with the invention.

Of course, these examples are given merely to illustrate the subject matter of the invention and in no way constitute a limitation of this subject matter.

DETAILED DESCRIPTION OF PARTICULAR EMBODIMENTS

EXAMPLE 1

Production of a $V_2O_5$/LiPON/$Li_{22}Si_5$ Micro-Battery

A microbattery comprising:
a $V_2O_5$ layer as first electrode;
a LiPON layer as electrolyte; and
a $Li_{22}Si_5$ layer as second electrode,
was produced in a multi-target ALCATEL 650 chamber (diameter of the sputtering targets: 150 mm).

The $V_2O_5$ layer was produced conventionally, that is to say by RF or DC sputtering using a vanadium or $V_2O_5$ target and in the presence of oxygen, on platinum, which itself was deposited on a silicon substrate. The LiPON layer was also produced conventionally by RF sputtering, using a $Li_3PO_4$ target and in the presence of nitrogen.

The $Li_{22}Si_5$ layer itself was produced by depositing, on the LiPON layer, five silicon layers each 150 nm in thickness, separated from one another by a lithium layer 100 nm in thickness, and by subjecting the multilayer thus obtained to an annealing operation at 200° C. for 1 hour in an argon atmosphere.

The silicon layers were deposited by RF sputtering, using a silicon target, under the following conditions:
power: 200 W;
1.3 Pa argon atmosphere;
substrate/target distance: 90 mm;
deposition rate: 0.6 µm/hour.

The lithium layers were deposited by thermal evaporation, using a lithium metal target, under the following conditions:
uncooled substrate;
substrate/target distance: 95 mm;
residual pressure: $10^{-6}$ mbar;
power: 110 A;
deposition rate: 0.8 µm/hour.

It should be noted that it is perfectly possible to manufacture the same microbattery starting to produce the $Li_{22}Si_5$ layer on a current collector and then by depositing, in succession, the LiPON layer and the $V_2O_5$ layer.

EXAMPLE 2

Production of a LiTiOS/LiPON/Si Micro-Battery

A microbattery comprising:
a LiTiOS layer as first electrode;
a LiPON layer as electrolyte; and
a silicon layer as second electrode,
was produced in a multi-target ALCATEL 650 chamber (diameter of the sputtering targets: 150 mm).

The LiTiOS layer was produced by depositing, on platinum, itself deposited on a silicon substrate, ten TiOS layers each 100 nm in thickness, separated from one another by a lithium layer 50 nm in thickness and by subjecting the multilayer thus obtained to an annealing operation at 200° C. for 1 hour in an argon atmosphere.

The TiOS layers were deposited by RF sputtering, using a titanium target and an argon/$H_2S$ atmosphere, under the following conditions:
- power: 500 W;
- 0.2 Pa argon/$H_2S$ atmosphere;
- substrate/target distance: 90 mm;
- deposition rate: 0.67 μm/hour.

The lithium layers were deposited by thermal evaporation, using a lithium metal target, under the same conditions as those used in Example 1.

Next, the LiPON and silicon layers were produced conventionally, that is to say by RF sputtering, using a $Li_3PO_4$ target in the presence of nitrogen in the case of the LiPON layer, and by RF or DC sputtering, using a silicon target in an argon atmosphere, in the case of the silicon layer.

The invention claimed is:

1. Process for manufacturing a lithiated electrode, which is formed of a single homogeneous material comprising lithium, the process comprising:
    depositing on a substrate several layers of a non-lithiated electrode material and several lithium layers to form a multilayer consisting of an alternation of layers of non-lithiated electrode material and lithium layers, this multilayer starting with and terminating with a layer of non-lithiated electrode material; and
    thermally annealing the multilayer thus formed at a temperature ranging from 100 to 300° C. thereby causing diffusion of the lithium of the lithium layers into the layers of non-lithiated electrode material thereby obtaining the lithiated electrode formed of the single homogeneous material comprising lithium.

2. Process according to claim 1, which comprises depositing on the substrate:
    a) a layer of non-lithiated electrode material;
    b) a lithium layer; and
    c) a layer of non-lithiated electrode material,
and in which steps b) and c) are repeated from 1 to 30 times.

3. Process according to claim 1, in which the thermal annealing is carried out in an inert atmosphere.

4. Process according to claim 3, wherein the thermal annealing is carried out at a temperature of about 200° C. for about 1 hour.

5. Process according to claim 1, in which the layers of non-lithiated electrode material are deposited by sputtering.

6. Process according to claim 1, in which the lithium layers are deposited by vacuum thermal evaporation.

7. Process according to claim 1, in which the non-lithiated electrode material is chosen from vanadium oxides, manganese oxides, copper sulphides, titanium oxysulphides and tungsten oxysulphides.

8. Process according to claim 1, in which the non-lithiated electrode material is chosen from silicon and alloys thereof, tin and alloys thereof, carbon, indium nitrides, tin nitrides, tin oxides, cobalt oxides and SiTONs.

9. Process according to claim 1, in which the layers of non-lithiated electrode material each have a thickness of about 50 nm to 1 μm.

10. Process according to claim 1, in which the lithium layers each have a thickness of about 10 nm to 0.5 μm.

* * * * *

UNITED STATES PATENT AND TRADEMARK OFFICE
CERTIFICATE OF CORRECTION

PATENT NO. : 8,697,287 B2
APPLICATION NO. : 11/658525
DATED : March 18, 2014
INVENTOR(S) : Levasseur et al.

It is certified that error appears in the above-identified patent and that said Letters Patent is hereby corrected as shown below:

In the Claims

Column 5, line 29, claim 1, please replace "300° C." with --300° C--; and

Column 6, line 12, claim 4, please replace "200° C." with --200° C--.

Signed and Sealed this
Fifteenth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,697,287 B2
APPLICATION NO.   : 11/658525
DATED             : April 15, 2014
INVENTOR(S)       : Salot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this
Twenty-ninth Day of September, 2015

Michelle K. Lee
*Director of the United States Patent and Trademark Office*